United States Patent [19]

Doggett

[11] Patent Number: 4,498,737
[45] Date of Patent: Feb. 12, 1985

[54] ADJUSTING MECHANISM FOR USE WITH DIODE LASERS

[75] Inventor: David E. Doggett, Cupertino, Calif.

[73] Assignee: Benson Inc., San Jose, Calif.

[21] Appl. No.: 352,816

[22] Filed: Feb. 26, 1982

[51] Int. Cl.³ .................................................. G02B 7/00
[52] U.S. Cl. ..................................... 350/237; 350/255
[58] Field of Search ................. 350/237, 247, 252, 255

[56] References Cited

U.S. PATENT DOCUMENTS

| 3,751,139 | 8/1973 | Malherbe | 350/252 |
| 4,030,815 | 6/1977 | Andrevski et al. | 350/255 |
| 4,060,309 | 11/1977 | Le Noane et al. | 350/96.18 |
| 4,203,652 | 5/1980 | Hanada | 372/101 |

FOREIGN PATENT DOCUMENTS

| 2623389 | 12/1976 | Fed. Rep. of Germany | 372/109 |
| 610040 | 6/1978 | U.S.S.R. | 350/252 |

OTHER PUBLICATIONS

Adams, Jr., L., "Eccentric Adjustment for Centering Lens", IBM Tech. Disc. Bull., 9-1977, p. 1292.

*Primary Examiner*—William H. Punter

[57] ABSTRACT

A structure for focusing, collimating or diverging the light beam from a solid state laser diode comprises means non-symmetrically mounted between the structure for holding the lens system and the means for holding the laser diode thereby to allow the laser diode to be adjusted in position relative to the lens system along the optical axis of the lens system. Surprisingly, the non-symmetrical mounting of the adjusting means relative to the optical axis of the lens system does not cause any substantial transverse movement of the laser diode relative to the optical axis of the lens system. In one embodiment, the adjusting means comprises a screw rotatably mounted such that one end of the screw is rotatably screwed into with the structure holding the lens system and the other end of the screw is in rotatable contact the structure holding the laser diode. This other end is adapted to receive a turning instrument thereby to allow the screw to be rotated to thus adjust the position of the laser diode relative to the lens.

11 Claims, 9 Drawing Figures

ADJUSTING MECHANISM FOR USE WITH DIODE LASERS

BACKGROUND OF THE INVENTION

1. Field of the Invention

This invention relates to a laser diode structure and, in particular, to a support mechanism for accurately focusing, collimating or diverging the beam produced by a laser diode.

2. Prior Art

The accurate focusing, collimating or diverging of the output light from a laser diode has been a problem in the use of these diodes to generate laser beams to be used for a number of purposes including printing. Typically, the output light from a laser diode is passed through a lens system which focuses, collimates or diverges the light beam. The lens system is formed in a housing. Precision threads are formed on the lens housing and the lens housing is then screwed into a second housing threaded internally to provide threads mating with those on the lens housing. The second housing is mounted in a fixed relationship to the fixed diode. The lens system is screwed into the second housing. The lens system, when rotated to adjust the focus of the beam, rotates concentrically around its optical axis. However, both sets of threads must be precision machined to ensure that the optical axis of the lens system is congruent with the axis of rotation of the lens housing. In other words, the optical axis and the axis of rotation of the lens system must coincide. This requires precision machining and accurate lens formation, both of which increase the cost of the lens system.

Another prior art structure to do this uses accurately formed sleeves. The lens system slides along notches in the sleeves parallel to the optical axis of the lens system to prevent lens rotation. Set screws lock the lens system in position. This method has limited accuracy and results in some undesirable transverse movement of the lens when the lens is locked by tightening the set screws.

SUMMARY

This invention overcomes the difficulty associated with the prior art alignment of a lens system to a laser diode by providing a structure which allows the lens system to be moved along the optical axis for focusing, collimating or diverging of the beam from the laser diode without at the same time causing the lens system to be moved transverse to the optical axis of the lens system.

In accordance with this invention, structure for adjusting the position of a solid state laser diode along the optical axis of a lens system comprises means for holding the lens system, means for holding the laser diode relative to said lens system, and means, non-symmetrically mounted with respect to said optical axis between said means for holding the lens system and said means for holding the laser diode, for adjusting the position of the laser diode relative to said lens system along the optical axis of said lens system without causing any appreciable movement of the laser diode transverse to the optical axis.

In one embodiment, said means for adjusting comprises a screw rotatably mounted in the means for holding the lens system and in contact with the means for holding the laser diode so as when rotated to move the means for holding the laser diode along the optical axis of the lens system.

A structure constructed in accordance with this invention is surprisingly inexpensive yet accurate. This structure self-locks the laser diode in the proper position relative to the lens system to ensure the proper relative positions of the lens system and laser diode over time.

DETAILED DESCRIPTION

It should be understood that the embodiments to be described herein are merely illustrative of the invention and are not meant to be limiting.

Figure 1:
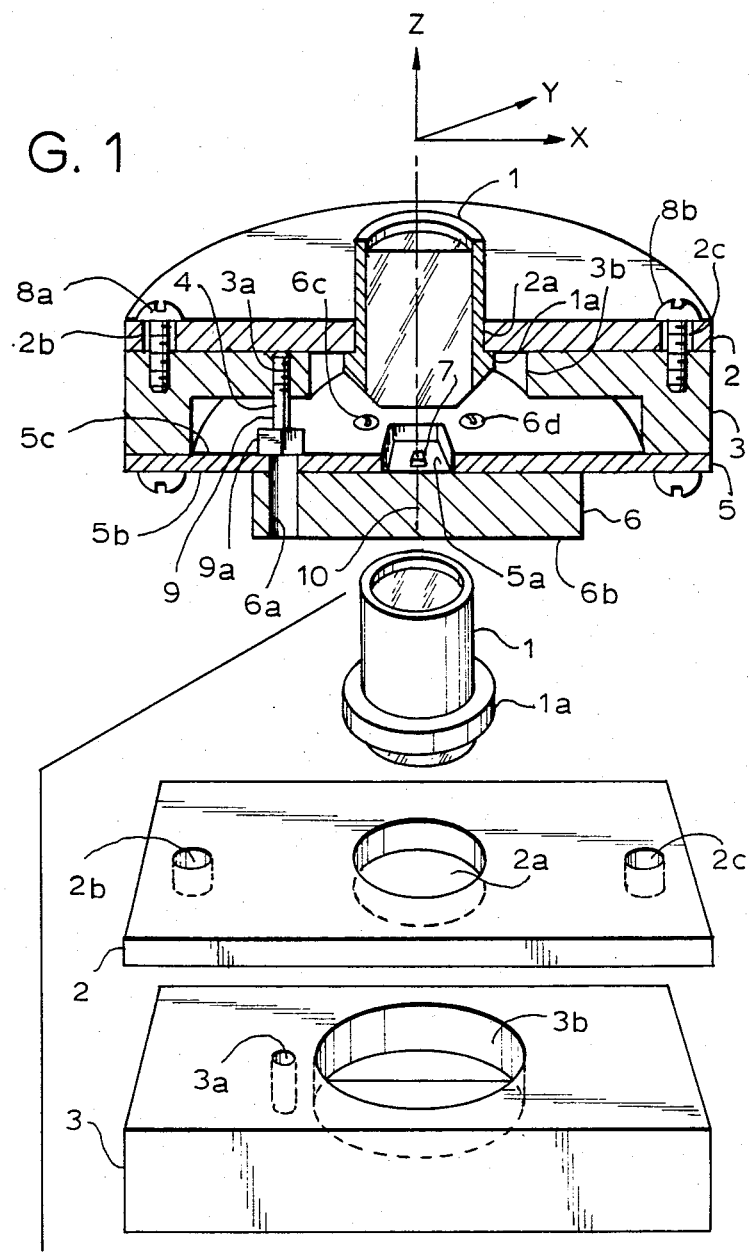
FIG. 1 illustrates in cross section the structure of this invention.

FIG. 1 illustrates in cross-section one structure constructed in accordance with this invention. As shown in FIG. 1, lens system 1 is mounted in a cylindrical opening 2a formed in the interior of housing 2. Cylindrical opening 2a has a circular cross-section. The cylindrical opening 2a is formed in a holder 2 which has generally a circular outer shape. This outer shape can, of course, be other than circular if desired, and its outer shape is not crucial. In one embodiment, the outer periphery of holder 2 is substantially square, as shown in the exploded view of FIG. 2.

Spacer 3 (which is a one piece annular shape of which two cross-sections are shown in FIG. 1), holds lens system 1 a selected distance from the laser diode 7 mounted in cavity 5a and allows the adjustment of the lens system in the X, Y directions independently of the distance along the Z axis between the lens 1 and the laser diode 7. The spacer 3 is attached to holder 2 by means of screws 8a and 8b as shown. Mounted to the bottom of spacer 3 is a disc or diaphragm 5 (which again can be of any desired external shape) with an opening 5a in the middle. Diaphragm 5 can, in one embodiment, comprise a printed circuit board although the diaphragm need only be made of a material that is thin enough to be deformable. Mounted on the face 5a of diaphragm 5 is support substrate 6 which can, if desired, serve to electrically ground the system. In general, however, substrate 6 need only be a material, conductive or not, that will support the laser diode 7. Laser diode 7 is mounted in the opening 5a on support substrate 6. An electrical contact to laser diode 7 is made in a well-known manner by means of leads (not shown). Support 6 in one embodiment is copper, but can also be any other appropriate material.

In accordance with this invention, a cap head screw 4, the head 9a of which is accessible through opening 6a in support 6, is mounted between holder 3 and diaphragm 5 off the optical axis 10 of lens system 1. To adjust the position of diode 7 relative to lens 1 a tool (i.e. a turning instrument such as an Allen wrench or screw driver designed to mate with the head of cap head screw 4) is inserted down hole 6a into locking contact with head 9a of screw 4. The head 9a of screw 4 is larger in diameter than the opening 6a in diaphragm 5 to allow head 9a to rotatably press against diaphragm 5 when rotated. Screw 4 with threads 9 which mate with threads formed on the inner surface of opening 3a (see FIG. 2) in spacer 3 is then rotated so as to push diaphragm 5 away from lens 1 or to allow diaphragm 5 to spring back to its normal position closer to lens 1. As is well known in optics, during normal operation and assuming the light from lens system 1 is not to diverge, laser diode 7 is located in the focal plane of lens system 1 when the light beam from laser diode 7 is being collimated. When the light beam from laser diode 7 is being focused, laser diode 7 is moved further from lens system 1. Surprisingly, I have discovered that when screw 4 is so rotated, diode 7 moves only along the optical axis 10 of lens system 1 and not transverse to this axis. Accordingly, the displacement of diode 7 in the "Z" direction (which is parallel to optical axis 10) can be actively controlled merely by one off-axis (i.e. non-symmetrical) adjusting screw in the system. When the proper adjustment of laser diode 7 along the optical axis 10 has been attained to give a collimated light beam, the screw 4 is under compression and diaphragm 5 is under tension thereby preventing the system from changing its adjustment with time due to vibrations. Further movement of laser diode 7 away from lens system 1 can focus the light from laser diode 7 on a plane closer than infinity.

After the laser diode 7 has been adjusted along optical axis 10 in the Z direction, screws 8a and 8b can be loosened slightly to allow the holder 2 to be adjusted in the X, Y direction thereby properly placing the beam from laser diode 7 on a target. To allow this X,Y adjustment, the openings 2b and 2c in holder 2 through which screws 8a and 8b pass are made larger than the diameter of screws 8a and 8b to allow lateral movement of holder 2. Similarly, the opening 3b (see FIG. 2) in spacer 3 is made sufficiently larger than the outer diameter of portion 1a of lens system 1 to allow this lateral movement.

Figure 2:
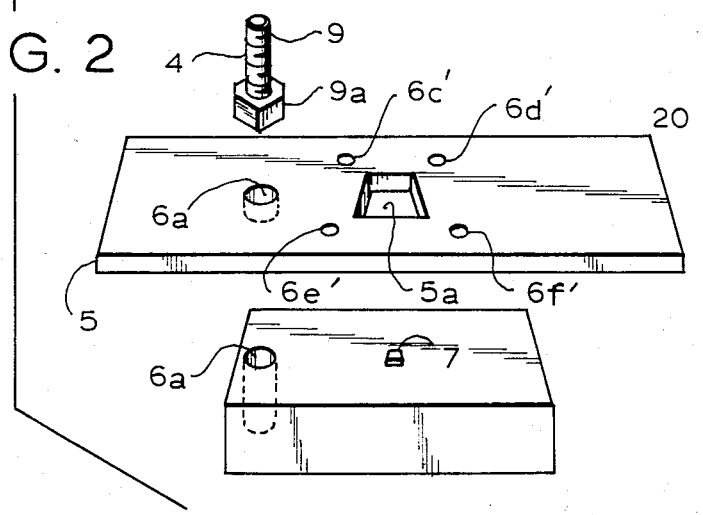
FIG. 2 illustrates isometrically and in an exploded view the components of another embodiment this invention similar to that shown in FIG. 1.

FIG. 2 illustrates an exploded cutaway view of the elements of this invention in an embodiment of rectangular shape. The elements shown in FIG. 2 have identical numbers to the corresponding elements in FIG. 1.

Figure 3:
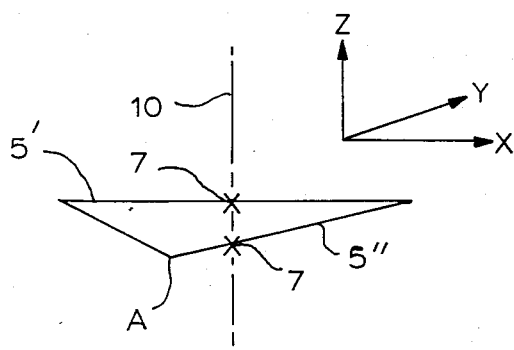
FIG. 3 illustrates graphically the operation of the structure of this invention.

FIG. 3 illustrates graphically the deformation of diaphragm 5 in response to rotation of adjusting screw 4.

As shown in FIG. 3, diaphragm 5 is displaced from a nominal position denoted 5', to a displaced position denoted 5''. The head 9a of screw 4 contacts diaphragm 5 at point A and results in the displacement of laser diode 7 along optical axis 10. There is substantially no movement of laser diode 7 in the x or y directions transversed to optical axis 10.

Figure 4:
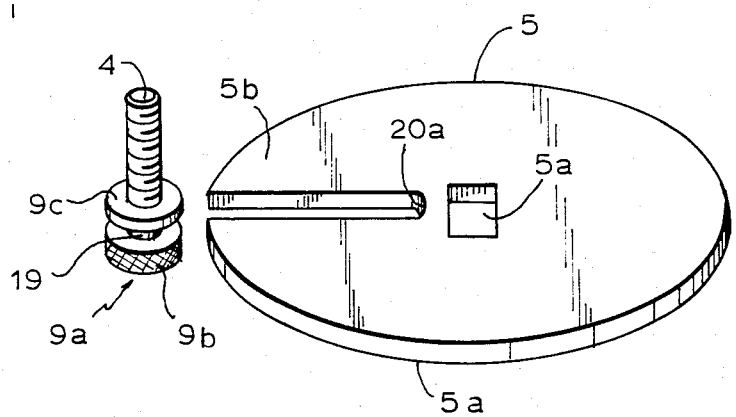
FIGS. 4 through 9 illustrate alternate structures for implementing this invention.

While the invention has been described in a manner such that diaphragm 5 is normally moved away from lens system 1 (FIG. 1) to allow the focusing or collimating of the light from laser diode 7, if desired, the structure can be arranged so that diaphragm 5 is moved toward lens system 1 to do this. In this embodiment, the adjusting screw 4 would be arranged so that the bottom of its head 9a contacts the bottom 5a of diaphragm 5 or the bottom 6b of copper block 6 rather than the top 5b of diaphragm 5. In this way, when screw 4 is rotated so as to draw laser diode 7 closer to lens 1, the screw is under tension as it bends diaphragm 5 towards lens 1. This pressure again holds diaphragm 5 in the proper location. A combination of two screws, one contacting the top surface 5b of diaphragm 5 and the other the bottom surface 5a, allows the diaphragm to be moved in either direction by appropriate rotation of the screws. A single screw with an annular channel 19 in head 9a (see FIG. 4) which slides along and then rotates at the end 20a of slot 20 which diaphragm 5 can likewise be used to allow one screw 4 to move diaphragm 5 and laser diode 7 in both directions along the Z axis. The head 9a of the screw 4 contains an annular race 19 in which the inner surface of a slotted opening 20 in diaphragm 5 rests such that one side 9b of the head 9a will contact side 5a of diaphragm 5 and the other side 9c of the screw head 9a will contact side 5b of diaphragm 5. The screw is easily mounted in the diaphragm 5 by sliding annular channel 19 along slot 20 to end 20a. FIG. 4 illustrates schematically this structure.

Figure 5:
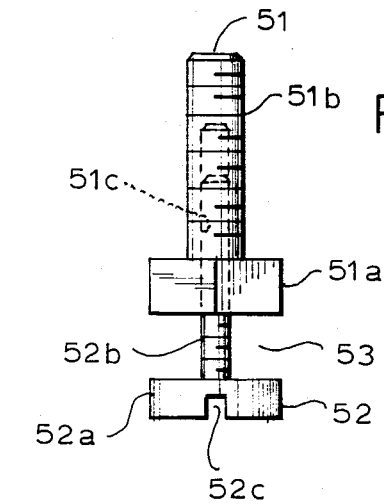

Alternative embodiments for implementing this invention are disclosed in FIGS. 5, 6, 7 and 8. In FIG. 5, a combination of two screws to replace the annular structure disclosed in FIG. 4 is shown. In FIG. 5, a first screw 51 has a threaded stem portion 51b and a head 51a formed upon the end of threaded portion 51b. Female opening 51c is formed in stem 51b. A second screw 52 comprises a threaded portion 52b formed to threadably mate with threads formed on the inner surface of opening 51c. Head 52a is formed on the end of threaded portion 52b. The result is an opening 53 between head 51a and head 52a which performs the same function as annular channel 19 in the structure shown in FIG. 4 but which avoids the need for slot 20. The spacing of head 52a from head 51a is determined by the thickness of diaphragm 5. Screw 52 is locked into the opening 51c in screw 51 by an appropriate locking compound such as the well-known adhesive "Loctite" made by the Loctite Corporation in Newington, Conn., 06111. An opening 52c in the head 52a receives a turning instrument such as a screw driver which then can be used to rotate the combined structure to adjust laser diode 7 in the manner described above in conjunction.

Figure 6:
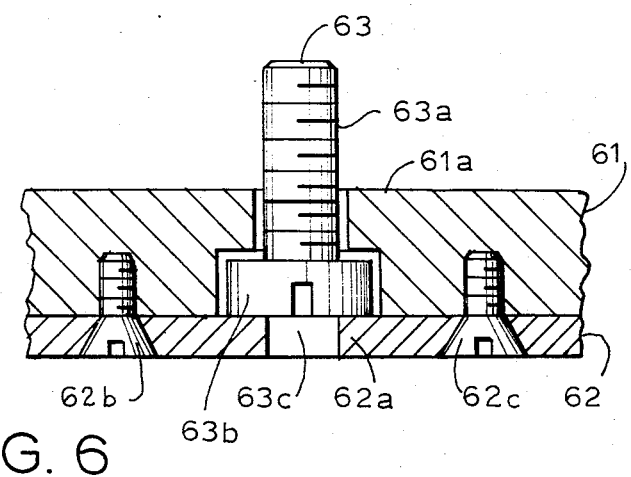

A structure similar in function to that shown in FIGS. 4 and 5 but using only one screw is shown in FIG. 6. In FIG. 6, screw 63 has a threaded stem 63a and a head 63b. Head 36b is designed to fit in a circular cavity formed by annular flange 61a on support structure 61 (which corresponds to substrate 6 shown in FIG. 1) together with annular flange 62a on plate 62. Plate 62 is then joined by means of screw 62b and 62e to substrate 61 to lock screw 63 in position by means of flange 62a. The opening in plate 62 adjacent flange 62a receives a turning instrument for mating with notch 63c in head 63b to rotate screw 63. Rotation of screw 63 in one direction or the other will move substrate 61 and thus laser diode 7 either toward the lens system or away from the lens system.

Figure 7:
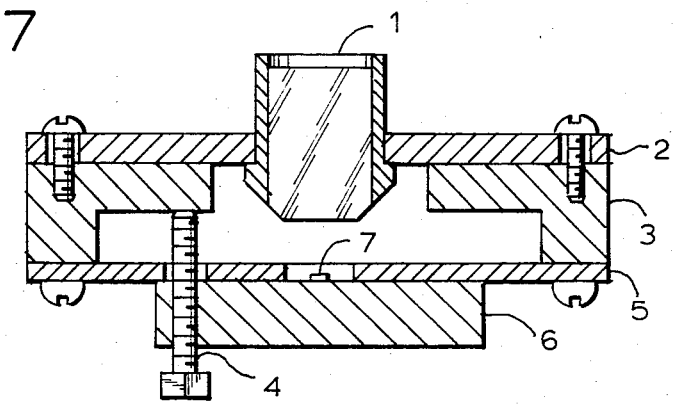

FIG. 7 illustrates in cross section a structure similar to that disclosed in FIG. 1 wherein screw 4 is threaded through support structure 6 rather than through spacer 3. Rotation of screw 4 results in laser diode 7 moving away from or toward lens system 1 in the same manner as described above in conjunction with FIG. 1.

Figure 8:
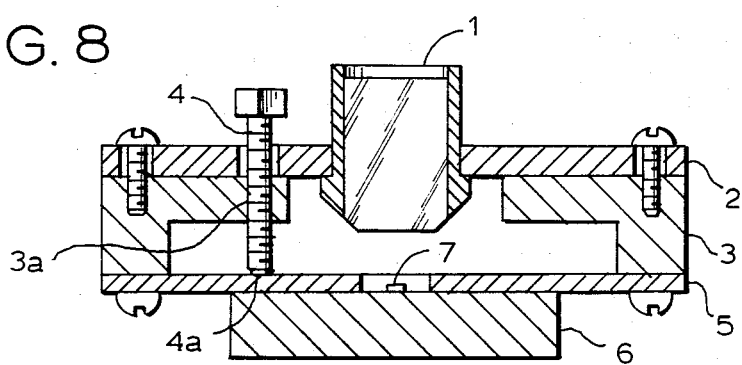

FIG. 8 illustrates an alternative embodiment of this invention wherein a set screw 4 passes through an opening in support 2 and is threaded through an opening 3a in spacer 3. The end 4a of screw 4 contacts diaphragm 5 and allows diaphragm 5 to be pushed away from lens system 1 thereby adjusting laser diode 7 in the same manner as described above.

In the embodiment of FIG. 1 and similar structures, lens 1 is inserted into opening 2a in lens support structure 2 such that annular flange 1a presses against the bottom surface of support 2. A small amount of an appropriate adhesive, such as "Loctite", then firmly secures lens system 1 in support structure 2.

Figure 9:
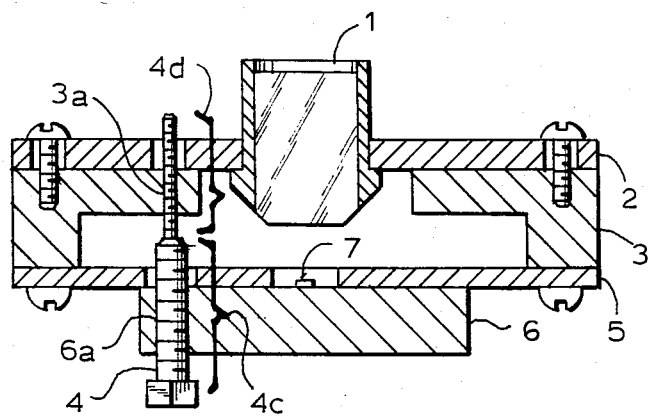

FIG. 9 illustrates an additional embodiment of this invention using a screw 4 with differential threads formed thereon. In the structure of FIG. 9, screw 4 has a stem of two parts, each with a different diameter. Portion 4d has a smaller diameter than portion 4c. Portion 4d is threaded with threads having a first selected pitch, while portion 4c is threaded with threads having second selected pitch. Opening 6a in support 6 is internally threaded to match the pitch of the threads on portion 4c while opening 3a in spacer 3 is internally threaded to match the pitch of the threads on portion 4d. In placing screw 4 into the structure of FIG. 9, the portion 4d passes unhindered through the threaded opening 6a in support structure 6 but threadably mates with the threads on the interior of opening 3a. Shortly thereafter, the first of the threads in portion 4c mate with the threads on the interior of opening 6a. Because the pitch of the threads on portion 4d is slightly smaller (i.e., more threads per inch) than the pitch of the threads in portion 4c, a given rotation of screw 4 will result in the laser diode 7 being forced away from lens system 1. Alternatively if the pitch of the threads on portion 4d is greater than the pitch of the threads on portion 4c, laser diode 7 will be pulled in toward lens 1 by this given rotation. Rotation in the opposite direction will give the opposite result. The difference in pitch can be made as small as desired thereby to allow extremely precise control of the position of the laser diode relative to the lens system.

While each of the structures in the Figures shows a substrate 6 for holding laser diode 7, it should be understood that substrate 6 can, if desired, be eliminated and laser diode 7 mounted directly on diaphragm 5.

One word is in order about the location of screw 4 as illustrated in FIGS. 1 and 2. Four holes 6c', 6d', 6e' and 6f' are provided in diaphragm 5 as shown in FIG. 2 to allow the passage of screws (such as screw 6c and screw 6d illustrated in FIG. 1) through diaphragm 5 to attach substrate 6 to diaphragm 5. In one embodiment, opening 6a through diaphragm 5 and substrate 6 is formed at a point on line 20 which is located symmetrically between openings 6c' and 6d' on the one hand and openings 6e' and 6f' on the other hand.

While two embodiments of this invention have been described, other embodiments of this invention will be obvious in view of the above disclosure. For example, lens system 1 can be mounted on a flexible diaphragm and moved relative to laser diode 7, if desired.

What is claimed is:

1. Structure for adjusting the position of a solid state laser diode along the optical axis of a lens system comprising:
   first means for holding the lens system;
   second means for holding the laser diode spaced relative to said lens system along said optical axis;
   securing means for attaching the first means to the second means at two points, said points being spaced from the laser diode and substantially on opposite sides thereof; and
   means mounted between said laser diode and one of said points for adjusting the position of the laser diode relative to said lens system along the optical axis of said lens system without any appreciable movement of the laser diode transverse to the optical axis.

2. Structure as in claim 1 wherein said means for adjusting self-locks said laser diode in position relative to said lens system to prevent change in position of said laser diode along the optical axis of said lens system with time.

3. Structure as in claim 2 including means for adjusting the position of said lens system relative to said laser diode transverse to the optical axis of said lens system without affecting the distance between said laser diode and said lens system.

4. Structure as in claim 1 wherein said means for adjusting comprises a screw means, one end of which is rotatably mounted in said means for holding the lens system such that the other end of said screw means is in contact with said means for holding the laser diode, and wherein the other end of said screw means is adapted to receive a turning instrument, so that rotation of said screw means by a turning instrument causes said laser diode to move along the optical axis of said lens system without substantial transverse motion relative to said optical axis thereby to focus, collimate or diverge the light from said laser diode.

5. Structure as in claim 4 wherein said screw means comprises a screw with a head, said head containing an annular channel, said annular channel forming a surface of rotation the axis of which is congruent with the axis of rotation of said screw, and wherein said means for holding the laser diode contains a slot suitable for receiving the annular channel formed in the head of said screw means, whereby rotation of the screw means either clockwise or counterclockwise results in the movement of said laser diode in one direction or another direction along the optical axis of said lens system.

6. Structure as in claim 4 wherein said screw means comprises a screw with a stem containing two parts of different diameters, a first part of a first diameter and a second part of a second diameter greater than said first diameter, said second part being closer to the head of said screw means than said first part, the first part having a first thread of a first pitch and said second part having a second thread of a second pitch formed thereon, said second pitch being different from said first pitch, thereby to allow differential movement of said laser diode relative to said lens system by rotating said screw means.

7. Structure as in claim 6 wherein said second pitch is greater than said first pitch thereby to move said laser diode away from said lens system upon the rotation of said screw means in a first direction and to move said laser diode closer to said lens system upon rotation of said screw in the opposite direction.

8. Structure as in claim 6 wherein said second pitch is less than said first pitch so as to bring said laser diode closer to said lens system upon rotation of said screw means in a first direction and to move said laser diode away from said lens system upon rotation of said screw means in the opposite direction.

9. Structure as in claim 1, wherein said two attachment points are symmetrically spaced from the laser diode.

10. An optical apparatus comprising a lens system with a light-emitting element spaced therefrom, and adjustment means permitting relative motion between the lens system and said element to focus, collimate or diverge the light from said element, said lens system being mounted on a first support and said element being mounted on a second support, said supports being fixed to each other at two points with said element being between them, said adjustment means being between said element and one of said points to enable said relative motion while keeping the element substantially on the optical axis of the lens system.

11. The apparatus of claim 10 wherein whichever one of the first and second supports that is movable by the adjustment means being comprised of a resilient material so that it can be adjusted along the optical axis despite being fixed at said points.

* * * * *